United States Patent
Escola et al.

(10) Patent No.: US 9,654,636 B2
(45) Date of Patent: May 16, 2017

(54) SYSTEM AND METHOD FOR TELEPHONE COMMUNICATIONS ON THE INTERNET

(71) Applicant: WHISBI TECHNOLOGIES, S.L., Barcelona (ES)

(72) Inventors: Jose Luis Cantero Escola, Molins de Rei (ES); Alex Bisbe Tosat, Sant Cugat del Valles (ES)

(73) Assignee: WHISBI TECHNOLOGIES, S.L., Barcelona (ES)

( * ) Notice: Subject to any disclaimer, the term of this patent is extended or adjusted under 35 U.S.C. 154(b) by 0 days.

(21) Appl. No.: 14/054,076

(22) Filed: Oct. 15, 2013

(65) Prior Publication Data
US 2015/0103996 A1    Apr. 16, 2015

(51) Int. Cl.
*H04M 3/00* (2006.01)
*H04M 3/51* (2006.01)
*H04M 7/00* (2006.01)

(52) U.S. Cl.
CPC ......... *H04M 3/5191* (2013.01); *H04M 7/003* (2013.01)

(58) Field of Classification Search
CPC .... H04M 3/5191; H04M 3/5183; H04M 3/51; H04M 3/42314

USPC .............. 379/265.09, 198, 265.02
See application file for complete search history.

(56) References Cited

U.S. PATENT DOCUMENTS

| | | | |
|---|---|---|---|
| 6,628,767 B1* | 9/2003 | Wellner | H04M 3/42161 379/202.01 |
| 8,238,540 B1* | 8/2012 | Duva et al. | 379/265.01 |

* cited by examiner

*Primary Examiner* — Rasha Al Aubaidi
(74) *Attorney, Agent, or Firm* — Gottlieb, Rackman & Reisman, PC

(57) ABSTRACT

METHOD AND SYSTEM FOR TELEPHONE COMMUNICATIONS ON THE INTERNET comprising a central server (1) and at least one web page server (2) connected to the Internet (I), with pages accessible from a user's computer (3) to contact with an agent (5) related to the web, and a PBX (7) or private automatic branch exchange connected to the central server (1) as a means for establishing communication. where the central server (1) controls the allocation of a DDI (4) to the web page server (2) by associating it with a unique PIN code (6) in order to establish a communication session, and the PBX (7) manages through the central server (1) and automatically the establishment of the communication between the DDI (4) and the user's telephone (8) that calls said DDI (4) and provides the PIN code (6).

10 Claims, 1 Drawing Sheet

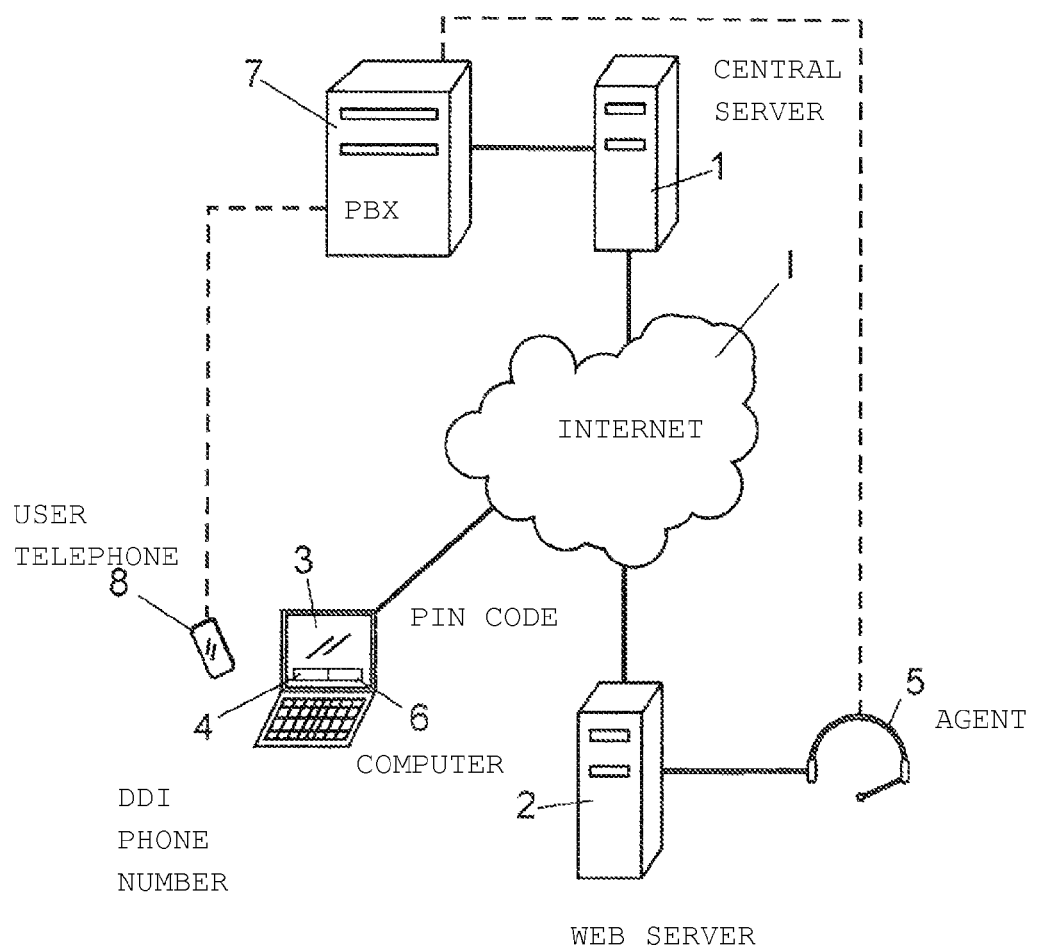

SYSTEM AND METHOD FOR TELEPHONE COMMUNICATIONS ON THE INTERNET

OBJECT OF THE INVENTION

The invention, as stated in the title of the present specification, relates to a system and method for telephone communications on the Internet, more specifically to a system with multimedia capacity of communication between a user and an agent, in a process of distance teleshopping, customer service, or other information, without said user providing contact details.

BACKGROUND OF THE INVENTION

Currently the users use Internet more and more often to search for product information, contract services, online shopping, for assistance, customer service; i.e. Internet has become a channel of communication between users and companies.

However it is common the need in some cases for the assistance of a specialized consultant, a seller, or contact with the company that advertises products on the Internet. For this reason many web pages publish numbers where a user can call to be attended personally, causing that the user stop using Internet and above all, causing the web page in question to lose the control, since it does not know that the customer is making a call. In addition, the traceability of the session is lost since often, the client arrives at the page in question through different advertisements; all this information accompanies the session online, and if at the end the customer performs a phone call leaving the online channel, this information is lost, wasting the Internet capabilities.

To solve this problem, there are systems known as 'click to call or call back', where the user provides the phone where he/she wants to receive the call, and an automatic system calls him/her, and being able to maintain a direct relationship between the call and the Web page.

There are even more advanced systems, where apart from the session, they synchronize a videoconference session with the call to the physical phone, such as the system described in Patent No. US2010277564, and Patent No. US2011305328 of which is the owner the Applicant himself, humanizing the experience and getting a better online experience.

However, even these systems require the customer to enter his/her phone number (click to call) to keep linked the information.

The problem of these systems (click to call), is that a high percentage of users do not want to provide the phone number on the Internet, and on the other hand it is an expensive system for the company because this shall have to cover the cost of the call to the user.

The objective of the present invention is therefore to develop an improved communication system in relation to the currently known systems as well as the system described in the cited patent US2011305328, and that provides a solution to the problem described in such a way that a telephone communication can be established from the Internet without the need that the user provides any information to the web page, maintaining the traceability at all times and the relationship between the data environment (web) and the phone environment (call).

EXPLANATION OF THE INVENTION

The system and method for telephone communications on the Internet proposed by the invention is configured as an outstanding novelty within its field of application, since, according to its implementation, the objectives indicated above as suitable are satisfactorily reached, the characterizing details making it possible being suitably included in the final claims attached to the present specification.

Specifically, the invention proposes a system and method for telephone communications on the Internet through which a session on the internet is synchronized with a telephone call made by the user so that an bidirectional audio communication is established but he/she should not provide any data on the website nor this shall have to call to the user.

This system can be combined with a unidirectional video communication system in which the user can view the person with which contacts by the phone call, such as that described in the patent US2011305328, to provide, additionally, also the video agent service in an incoming call service.

The system of the cited patent, and in which the system herein proposed is essentially based on, comprises a web page server with forms accessible from a remote computer by the user, a main server and contact centers equipped with at least a telephone terminal, a computer and a webcam connected to a videoconference server, to get in touch an agent with the user. The system also includes a PBX or private automatic branch exchange connected with the main server for a telephone connection between the user and the agent, and the main server comprises routing means of the computer and the videoconference server of the contact center.

The procedure is that, once the form is filled, the PBX sends a call to the user and if he/she picks up, it searches the suitable contact center establishing a direct telephone communication, while the central server establishes a videoconference virtual room through which the unidirectional video transmission from the webcam is routed exclusively for the user.

On the other hand, and unlike that set forth above, the system proposed by the present invention essentially comprises a central server and at least one web page server, both connected to the Internet, the web pages being accessible from the user's computer to contact with an agent related to the web. The system also provides a PBX or private automatic branch exchange connected to the central server as a means for establishing communication, with the particularity that in this case the central server controls the allocation of a DDI (Direct Dialing In) or telephone number to the web page server by associating it with a unique PIN (Personal Identification Number) code that specifically generates to establish a communication session, and the PBX manages through the central server and automatically the establishment of the communication between the DDI and the user's telephone when he/she calls said DDI and provides the PIN code.

More specifically, the method is as follows:

The user, surfing the Internet, arrives to a web page with this service.

On the website he/she can see a phone number (hereinafter DDI (Direct Dialing In)) followed by a numerical code (PIN—Personal Identification Number).

This DDI can be unique for this customer or can be selected from a list of phones available in the geographical area where the user is located.

The obtaining of the geographical area is via the IP that the user is using.

A centralized system has generated the PIN, and it must be unique for that DDI while this activates the session or has a related call.

The web page is asking on an ongoing basis a central server if someone has called DDI and has been identified with the PIN in question.

The user, if he/she is interested, calls the DDI number. At that time a recording prompts him/her to enter the PIN code he/she is viewing on-screen, capturing this information.

The user enters the PIN, if the entered PIN is being shown in any session at that time, related to the DDI to which the user has called, both sessions are linked and the central server is informed.

At that time, the web page (which as noted is consulting the status of that session to the central server) is reported as the customer that is viewing it has made a call to the phone that is displayed, and additionally it informs it about the phone number that the customer has used if it has been possible to detect it.

At this point, the web page can make an immense number of actions with this information, signaling through the Internet, having information from the browser on the user side. With this information, a videoconference session can be optionally started, so that the user can view the agent who is communicating with by telephone on the screen.

At the same time, the central server that already has identified the incoming call with the service advertised on the web, makes a call to the agent assigned to this service, putting in conference both calls in a simple way or following a process as described in the patent US2011305328, to connect and signal the call in the agent side.

The described system and method for telephone communications on the Internet therefore represents an innovation with features unknown up until now, reasons added to its practical usefulness and the privacy, and economic advantages that it provides.

DESCRIPTION OF THE DRAWINGS

To complement the description which is being made and with the object to help to a better understanding of the invention, a drawing is accompanied to the present specification, as an integral part thereof, in which the following has been depicted with an illustrative and non-limiting character:

FIG. 1—shows a scheme of the communication system of the claimed invention, symbolically presented by the main elements it comprises.

PREFERRED EMBODIMENT OF THE INVENTION

In view of the only mentioned FIG. 1, and according to the adopted numbering system, it can be seen therein how the proposing system consists of a central server (1) connected to the Internet (I), this central server (1) being associated with at least one web page server (2), also connected to the Internet (I), in which one or more web pages are installed wherein through the computer (3) to the user is displayed a DDI phone number (4) that allows contacting by phone with an agent (5) (depicted in FIG. 1 by the headphones through which the agent speaks and listens) related to said web page; said DDI (4) is associated with a PIN code (6) related in a unique way to said DDI to establish a communication session using a PBX (7) or private automatic branch exchange connected to the central server (1), the PBX (7) manages though the same and automatically the establishment of the communication between the DDI of the web page and the user's telephone (8) when he/she calls said DDI and provides the PIN code to generate a communication session between the web page agent and said user.

This ensures a direct communication between the user and the agent of the web page in question, without referrals to other pages and without requiring the user enters into the web page any data, nor that it is the agent who must make the call to the user.

To that end, the method includes the following steps:

The central server (1) loads in memory the information of all the DDI available by geographic area and all the DDI assigned to the specific web page servers (2) whether customers or they are associated to the central server to provide the communication service.

The central server (1) informs the PBX (7) or private automatic branch exchange that it waits to receive calls from this list of DDI. (PBX, Private Branch Exchange, and consisting of a telephone exchange system directly connected to the public telephone network by trunk lines to manage in addition to the internal calls, those incoming and outgoing with autonomy over any other telephone exchange system.

A user enters a web page with this service through a computer (3).

The web page server (2) makes a request through any standard protocol, HTTP/HTTPS, to the central server (1) to receive a PIN; as a parameter it provides the code that identifies the service that is showing and called "BRANCH", and the IP of the user who accessed.

The central server (1) receives the request and searches within memory if this "BRANCH" has a specific DDI associated, if it is not, it searches the geographic area associated to the IP via relation table, and it assigns the suitable DDI (4).

Once the DDI (4) has been selected, the central server, always working in memory, generates a unique PIN (6), non-existent at that time for this DDI.

The central server sends this PIN (6) together with the DDI (4) as a parameter back to the web page server (2) that has made the request.

The central server (1) is waiting to be notified (beacon) by the web page server (2) (If more than 60 seconds pass without receiving this notification, the DDI is released and is erased from memory. This time may vary depending on different factors or configurations.

The web page server (2) presents the DDI (4) provided by the central server (1) together with the PIN (6).

The web page server (2) sends a beacon to the central server (1) indicating that it is still active, this action is performed on a continuing basis.

The central server, when receives this beacon, sends it back to the web page server if any user is related to this session (session is the link between DDI and PIN)

If the user closes the web page, the sending of the beacon stops and after 60 seconds or within a previously stipulated time, the session is released and the PIN can be reused.

If the user calls to the indicated DDI (4), the PBX (7) detects the call, if it has this feature captures the telephone NUMBER (8) of the calling user, and a recording request he/she to enter the PIN (6) capturing it with a dial tone capture system.

The user enters the PIN.

Once the PIN has been entered the PBX (7) sends the information to the central server (1).

The central server (1) receives the information as a user has called DDI, has entered the PIN and in addition knows the telephone NUMBER (8) from which the call has been made.

The central server (1) checks in memory if an active PIN (6) exists for the DDI (4).

If said PIN is not active, it sends a error signal to the PBX.

When the PBX (7) receives the error signal repeats again the entire process from the point where it requests to the calling user that he/she enters the PIN (6).

If the central server (1) detects that there is a session that matches the DDI (4) with the PIN (6), it sends an OK signal to the PBX (7), and the next time it receives a beacon of the proper session will inform the client has called using the determined telephone NUMBER (8); from this moment the central server (1) adds a new condition to release the PIN (6), namely that the beacon is no longer received and the call has been hung up.

The PBX (7), when it receives the OK signal by the central server, forwards the call to the agent (5) or destination configured for this "BRANCH", putting in conference to both parties (the incoming call from the user with the agent or outgoing destination of the web page).

The central server (1), when it requests (continuously) the beacon, receives as response the confirmation that the client has called the DDI (4), optionally including the telephone NUMBER (8) from which the client is calling.

The web page server (2), immediately after, can run a wide variety of actions thanks to events in javascript, after this point the web page server ceases sending the beacon.

At the end of the call, the PBX (7) detects the action and informs the central server (1) which can release the PIN (6) related to the DDI(4).

In case of relating the destination to the session as well, i.e., the DDI of the agent with the user's telephone, when the agent picks up the call, and before making the transfer of the source, the PBX (7) can indicate via an IVR (Interactive Voice Response) the PIN (6) associated to this session, in order that the agent can access the environment linked to the user, activating for example in this way a videoconference session for which logically the agent must have at least one video camera (not shown in FIG. 1), or it can be followed the method explained in the patent US2011305328 to link both calls and provide a videoconference service and which essentially comprises a web page server with forms accessible from a computer by the user. Once this form is filled, the PBX makes a call to the user and if he/she picks up, it searches the suitable contact center, establishing a direct telephone communication, while the central server establishes a videoconference virtual room through which the unidirectional video transmission from the webcam is routed exclusively for the user.

Having sufficiently described the nature of the preferred embodiment of the present invention as well as the way to carry out it into practice, it will be apparent to those skilled in the art that the embodiments described herein are by way of illustration and not of limitation. Therefore, it is to be understood that various changes and modifications may be made in the embodiments disclosed herein without departing from the true spirit and scope of the present invention, as set forth in the appended claims.

The invention claimed is:

1. A system for telephone communication on the Internet comprising:

a central server connected to the Internet;

a web page server connected to the Internet for providing access to one or more web pages hosted on the web page server; and a PBX (private automatic branch exchange) connected to said central server;

said central server including an information memory with a list of DDI's (direct dialing in telephone numbers), said central server being configured to generate a unique pin code on demand from one of said web pages and to present said unique pin code and a DDI from said list to said one of said web pages for presentation to a specific user of said one web page; and wherein said PBX is configured to receive a call from the user through a user telephone when the user dials said DDI telephone number, said PBX being further configured to receive from the user the said unique pin code that is presented by said one web page, said PBX cooperating with said central server to identify the respective web page associated with said unique pin code and establishing a communication session between the user and the respective webpage in response to said call;

said central server reserving said unique pin code for the respective DDI during said communication session.

2. The system of claim 1 wherein each unique user is assigned a unique PIN code for presentation to the unique user by the respective web page.

3. In a system including a central server connected to the Internet, a web page server connected to the Internet for providing access to a plurality of web pages hosted on the web page server; and a PBX (private automatic branch exchange) connected to said central server; said central server including an information memory storing a plurality of DDIs (direct dialing in)numbers, a method of providing telephone communication between a user and a web page of said plurality of web pages, said user being associated with a user telephone, comprising the steps of:

Detecting by said web server when a user enters said web page;

Sending by said web server to said central server a message requesting a PIN code (personal identification number);

Receiving by said web server said PIN code;

Presenting a DDI and said PIN code to the user on said web page;

Detecting a phone call from the user by said PBX on said DDI;

Receiving by the PBX said PIN code provided by the user;

Transmitting said PIN code by said PBX to said central server;

Receiving an identification of the web server associated with said web page by said PBX; and Establishing a telephone communication session between the user phone and said web page by said PBX, said central server maintaining said PIN code assigned to said web base during said telephone communication session.

4. The method of claim 3 wherein once said telephone communication session is established, said web page server sends a beacon to said central server.

5. The method of claim 4 wherein said web page stops sending said beacon once the communication session is ended, and in response said central server releases said PIN code so that it is available for other telephone communication sessions.

6. The method of claim 3 wherein said web page is associated with a live agent, said telephone communication session-being established between the agent and the user having a unique relation with the data channel.

7. The method of claim 3 wherein in said step of requesting said PIN code, said web server sends an IP (Internet Protocol) address associated with the user to said central server and said central server uses said IP address to select said DDI number associated with the location.

8. The method of claim 3 wherein the user is associated with a phone with a user phone number and wherein in said step of receiving a call to said DDI number, said PBX detects said user phone number, said user phone number being provided to said web server.

9. The method of claim 3 further comprising assigning said web server a list of DDIs.

10. The method of claim 3 wherein said system includes several web servers, each web server serving several web pages, further comprising assigning a list of DDIs, each DDI being associated with one of said web server in response to said request and sending said DDI to said web server for presentation to a user.

\* \* \* \* \*